United States Patent
Charpentier

(10) Patent No.: US 7,337,893 B2
(45) Date of Patent: Mar. 4, 2008

(54) PREFORM FEEDER SYSTEM, PARTICULARLY OF A RECEPTACLE BLOWING MACHINE, COMPRISING MEANS FOR EJECTING BADLY POSITIONED PREFORMS

(75) Inventor: Alain Charpentier, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 10/583,943

(22) PCT Filed: Dec. 17, 2004

(86) PCT No.: PCT/EP2004/053559

§ 371 (c)(1), (2), (4) Date: Jul. 21, 2006

(87) PCT Pub. No.: WO2005/061352

PCT Pub. Date: Jul. 7, 2005

(65) Prior Publication Data

US 2007/0108018 A1    May 17, 2007

(30) Foreign Application Priority Data

Dec. 23, 2003 (FR) .................................. 03 51173

(51) Int. Cl.
   *B65G 47/256* (2006.01)
(52) U.S. Cl. .................. 198/454; 198/398; 198/453; 209/707
(58) Field of Classification Search ............. 198/453, 198/398, 454, 389; 209/707, 616, 701; 193/46
See application file for complete search history.

(56) References Cited

U.S. PATENT DOCUMENTS

| | | | | | |
|---|---|---|---|---|---|
| 1,803,993 | A | * | 5/1931 | Brennan | 221/162 |
| 2,252,498 | A | * | 8/1941 | Flaws, Jr. | 221/14 |
| 2,911,088 | A | * | 11/1959 | Ingham, Jr. et al. | 198/389 |
| 3,054,170 | A | * | 9/1962 | Benichasa et al. | 29/810 |
| 3,344,901 | A | * | 10/1967 | Schultz | 198/380 |
| 4,223,778 | A | * | 9/1980 | Kontz | 198/389 |
| 5,186,307 | A | * | 2/1993 | Doudement et al. | 198/454 |
| 6,189,701 | B1 | * | 2/2001 | Winter | 209/523 |
| 6,575,305 | B1 | * | 6/2003 | Casagrande | 209/616 |
| 6,790,412 | B2 | * | 9/2004 | Willenbring et al. | 422/63 |
| 6,968,936 | B2 | * | 11/2005 | Charpentier | 198/389 |

FOREIGN PATENT DOCUMENTS

WO         02/36466         5/2002

* cited by examiner

Primary Examiner—Douglas A Hess
(74) Attorney, Agent, or Firm—Young & Thompson

(57) ABSTRACT

A preform feeder system, particularly for feeding blow machines with receptacles such as bottles, of the type including, from upstream to downstream in the longitudinal direction of travel of the preforms, at least one sorting and alignment device whose top end is provided with preforms in a jumble and whose bottom end includes at least two alignment rollers, substantially parallel and rotated about their respective axis, that are designed to position the preforms in feeding rails, inclined relative to the horizontal, to convey them to a machine, and of the type including at least one ejection wheel that is arranged above the preforms and rotated about an axis which extends generally transversely, characterized in that the ejection wheel is arranged downstream of the alignment rollers so as to eject the incorrectly positioned preforms from the feeding rails.

21 Claims, 3 Drawing Sheets

PREFORM FEEDER SYSTEM, PARTICULARLY OF A RECEPTACLE BLOWING MACHINE, COMPRISING MEANS FOR EJECTING BADLY POSITIONED PREFORMS

The invention relates to a system of feeding preforms, particularly of a machine for blow moulding receptacles, comprising means of ejecting the incorrectly positioned preforms.

The feeding system will be more particularly described in the context of its application in an installation for the blow moulding or stretch-blow moulding of preforms made of PET (polyethylene terephthalate) for the manufacture of receptacles, particularly of hollow receptacles such as bottles or flasks.

Specifically, according to a known technique, such receptacles are usually produced in two steps.

In a first step, a PET preform, for example of the type that is illustrated in FIG. 1, is injection-moulded and, in a second step, the preform is directly or indirectly blow moulded.

Such a preform 10 comprises a substantially tubular body 12 that is closed at one of its axial ends and has, at its other end, a neck 14 which has, following this injection-moulding operation, the definitive shape of the neck of the final receptacle.

The neck 14 of the preform 10 comprises a thread 16 and an annular supporting collar 18 which extends, at the base of the neck, radially outwards.

There are arrangements in which the preforms, once injected, are directly transmitted to the blow moulding machine, the preforms being transported positively, that is to say that each preform is handled individually.

However, in many cases, the preforms are manufactured by injection with the aid of a first machine and are blow moulded to the definitive shape of the receptacle with the aid of a second specific blow moulding machine. Such a technology makes it possible, for example, to carry out the blow moulding operation as close as possible to the bottling location, the injection operation being able to be carried out in any other location.

In such cases in which the injection machine and the blow moulding machine are two totally independent machines, the installation comprising the blow moulding machine then usually has the preform feeding system designed to convey the preforms 10 to the machine.

Such a system of feeding preforms is, for example, described in document WO-A-02/36466 of the prior art.

In this document, FIG. 1 in particular represents in a schematic manner a preform feeding system of conventional type designed to feed a machine for blow moulding receptacles.

Consequently, a general description will be given hereinafter of such a system of feeding preforms and more particularly a description of the known means of ejecting the incorrectly positioned preforms which, although routinely used, do not give entire satisfaction.

In such a system, the preforms are most frequently tipped in a jumble into a bin, in the form of a hopper, of the feeding system.

The preforms are picked out of this bin by an elevator belt which, in its turn, tips the preforms, at a pre-established rate, at the top end of a sorting and alignment device. This device usually comprises two alignment rollers that are inclined relative to the horizontal and that are substantially parallel with one another. The two rollers are rotated in opposite directions, and are spaced from one another in order to allow a gap to subsist between the two rollers, along the two rollers, that is of a dimension slightly greater than the dimension of the body of the preforms. However, the spacing of the two alignment rollers is such that the transverse space between the two rollers is less than the dimension of the supporting collar situated at the base of the neck of the preform.

The sorting and alignment device is configured so that, under the effect of gravity, the preforms are forced towards the two rollers. Thus, simply by gravity, each preform tends to place itself between the two rollers, so as to be held supported by its collar on the rollers while having the body hanging down between the two rollers. The rotary motion of the rollers and their inclination ensures, on the one hand, the placement of the preforms one after the other, in the preferred position described hereinabove, and, on the other hand, the sliding of the preforms along the longitudinal axis of the rollers, towards the outlet of the sorting and alignment device where they are collected in a feeding rail itself connected, for example, to the blow moulding machine. In the feeding rail, the preforms thus accumulate preferably in a continuous line.

However, because the preforms are tipped in a jumble into the sorting and alignment device, and because of the random character of the placement of the preforms, some of them arrive close to the outlet of the sorting and alignment device (hence close to the feeding rail) without having been able to be positioned correctly between the two rollers. Tests have in particular made it possible to identify clearly determined incorrect positioning configurations of the preforms, particularly in the alignment rollers.

These are more particularly preforms called "lying" preforms, that is to say preforms that are not correctly oriented vertically as opposed to the preforms called "upright" preforms extending vertically, with the neck upwards, in the rollers, that is to say those that are held supported by their collar on the rollers while having their body hanging down between the two rollers.

The same applies in the particular case of at least two preforms nested in one another, that may be either of the "lying" type, or of the "upright" type, that is to say the case in which one preform is nested in another lower preform that is correctly oriented.

Naturally, such incorrectly positioned preforms cannot be inserted into the feeding rail and must in no circumstances be conducted or conveyed to the machine. This is why preform feeding systems usually comprise means designed to deal with these incorrectly positioned preforms.

Such means may consist of a repulsion wheel that is furnished with paddles and is arranged in the vicinity of the bottom end of the sorting and alignment device. This wheel rotates about an axis perpendicular to the axis of the alignment rollers and the paddles of this repulsion wheel are designed to sweep the space of the sorting and alignment device situated above the rollers in order to push back upstream, in the direction of travel of the preforms, any preform that is not correctly positioned between the rollers.

The principle of this repulsion wheel is that, statistically, the preforms manage to position themselves correctly after a certain number of repulses.

However, when it is a case of feeding machines at very high rates, for example machines capable of blow moulding more than 40 000 receptacles per hour, the conventional sorting and alignment systems sometimes have malfunctions, particularly when the preforms have a neck of significant diameter.

In these cases, because of the speed of travel of the preforms in the sorting and alignment device, it happens that the preforms repulsed upstream by the repulsion wheel never manage to position themselves correctly between the rollers.

In order to improve the processing of the incorrectly positioned preforms in the feeding systems, document WO-A-02/36466 proposes to modify the principle of use of the wheel so as no longer to repulse the incorrectly positioned preforms towards the alignment rollers but to eject them from the feeding system.

However, the ejection of the incorrectly positioned preforms with such a wheel does not give satisfaction in all cases and is therefore not totally reliable.

Specifically, it happens that certain incorrectly positioned preforms are nevertheless repulsed by the ejection wheel towards the alignment rollers or are not ejected through the ejection orifice. It has been determined that such incidents depend particularly on the position in which the incorrectly positioned preform is when it enters into contact with the ejection wheel. The position of the preform is totally random and unpredictable.

In addition, the positioning of the ejection wheel above the alignment rollers brings the incorrectly positioned preforms into contact with the radial paddles of the ejection wheel when the preforms are not yet all in order and those that have been correctly positioned sustain, under the action of the alignment rollers, a considerable acceleration that contributes to increasing the risks of incidents.

For example, in the case of two incorrectly positioned or not yet positioned preforms that are close to one another, there is then a risk of interference between these two preforms during ejection.

Consequently, such incidents are likely in a general manner to cause damage and blockages that may cause interruptions in the line of conveyed preforms, and even lead to a stoppage in the feeding of the preforms, and therefore to a stoppage of the blow moulding machine due to a lack of preforms.

Naturally, such stoppages are undesirable because they may cause the stoppage of the bottling line situated downstream of the blow moulding machine.

The object of the invention is therefore to propose a new design of the means of ejecting the incorrectly positioned preforms for preform feeding systems that make it possible to further increase the reliability of such systems, particularly in the case of systems designed to be used in installations comprising high rate machines.

With this object, the invention proposes a system of feeding preforms, particularly designed to feed machines for blow moulding receptacles such as bottles, of the type comprising, from upstream to downstream in the longitudinal direction of travel of the preforms, at least one sorting and alignment device whose top end is provided with preforms in a jumble and whose bottom end comprises at least two alignment rollers, substantially parallel and rotated about their respective axis, that are designed to position the preforms in feeding rails, inclined relative to the horizontal, to convey them to a machine, and of the type comprising at least one ejection wheel that is arranged above the preforms and rotated about an axis which extends generally transversely, characterized in that the ejection wheel is arranged downstream of the alignment rollers so as to eject the incorrectly positioned preforms from the feeding rails and in that it comprises means of lifting the incorrectly positioned preforms of the lying type that extend in particular generally transversely relative to the feeding rails, so as to cause them to be ejected by the ejection wheel arranged downstream.

Thanks to the positioning of the ejection wheel downstream of the alignment rollers, the operation of ejecting the incorrectly positioned preforms is carried out on preforms that are well ordered in a substantially continuous line moving at a generally constant speed in a rectilinear stabilization section of the feeding rails.

Advantageously, this thus eliminates the risks of repulsion to the rollers, of interference and consequently of blockages likely to cause production stoppages.

According to other features of the invention:
- the lifting means comprise at least one control section forming a ramp designed to interact with a part of the preform lying transversely so as to cause it to be lifted from the rails to a high position for ejection, in which the said part of the preform is capable of entering into contact with a part of the wheel to be ejected;
- the lifting means comprise, downstream of the control section forming a ramp, a retention section in order to retain the preform, after lifting, in its high position for ejection;
- the feeding rails comprise at least one preform stabilization section, generally rectilinear, that is interposed longitudinally between the alignment rollers and the ejection wheel;
- the ejection wheel is positioned at a determined height above the feeding rails so as to eject the incorrectly positioned preforms without entering into contact with the preforms correctly positioned in the rails;
- the axis of the ejection wheel extends generally in a plane parallel to the plane of the rails and so as to form an angle lying between 0° and 90°, particularly between 20° and 75°, relative to the perpendicular to the longitudinal direction of travel of the preforms in the feeding rails;
- the ejection wheel comprises a shaft having, in section along a plane orthogonal to the axis of rotation of the wheel, a parallelepipedic or triangular section;
- the ejection wheel comprises flexible radial elements, such as radial paddles, that are each fixedly attached to one of the faces of the shaft of the ejection wheel;
- the system comprises means of recovering and/or recirculating, to the sorting and alignment device, the incorrectly positioned preforms that have been ejected.

Other features and advantages of the invention will appear on reading the following detailed description and in the light of the drawings in which.

In the following description, identical reference numbers indicate parts that are identical or have similar functions.

Figure 2:
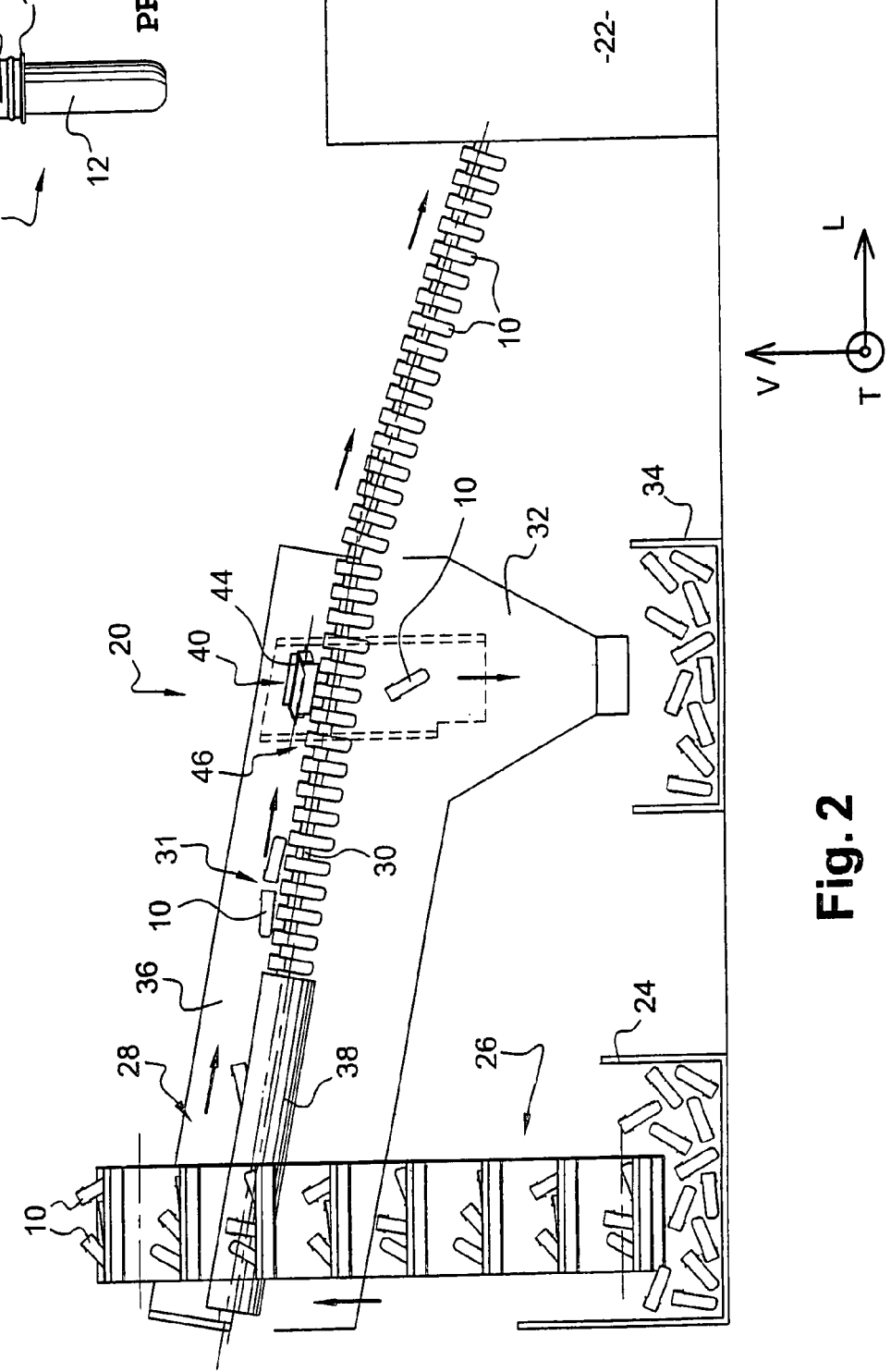
FIG. 2 is a schematic side view of a system of feeding preforms according to a preferred embodiment of the invention and comprising means of ejecting the incorrectly positioned preforms according to the invention.

By convention, and in a non-limiting manner, the terms "downstream" or "upstream" and the directions "longitudinal", "transverse" or "vertical" will be used to indicate respectively elements relative to the direction of travel of the preforms or positions according to the trihedral (L, V, T) shown in particular in FIG. 2.

Figure 1:
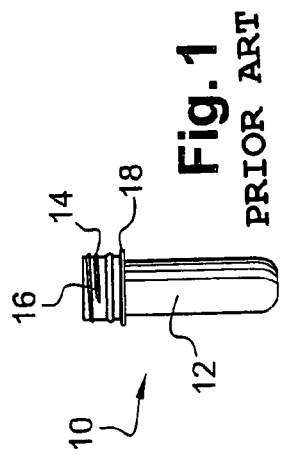
FIG. 1 represents schematically an example of a known preform capable of being used in a feeding system according to the teachings of the invention.

FIG. 2 shows in a very schematic manner a system 20 for feeding preforms according to a preferred embodiment of the invention. Such a feeding system 20 is for example designed to feed a blow moulding machine 22 with preforms 10 as shown in FIG. 1.

The feeding system 20 comprises upstream a storage bin 24, or hopper, in which the preforms 10 are stored in a jumble. An elevator 26 makes it possible to pick up the preforms 10 from the storage bin 24 in order to tip them at the top end of the sorting and alignment device 28. In this device 28, the preforms 10 are oriented with the neck 14 upwards and are aligned in a line so as to be subsequently delivered downstream to feeding rails 30 that transport the preforms 10 to a blow moulding machine 22.

The system 20 preferably comprises means of recovering the preforms that are incorrectly positioned during the orientation operation and that are ejected. Specifically, the preforms that have not been damaged during this operation may advantageously be reused in the system 20.

The recovery means consist, for example, of a recovery hopper 32 whose bottom end communicates with a recovery bin 34 into which the incorrectly positioned preforms 10 that have been ejected fall.

As a variant, the recovery means comprise a recirculation belt which makes it possible to return the ejected preforms to the storage bin 24. However, although such a recirculation belt makes it possible to automate the processing of the ejected preforms, it has the risk of reinserting into the feeding system nested preforms, particularly of the lying type.

Figure 3:
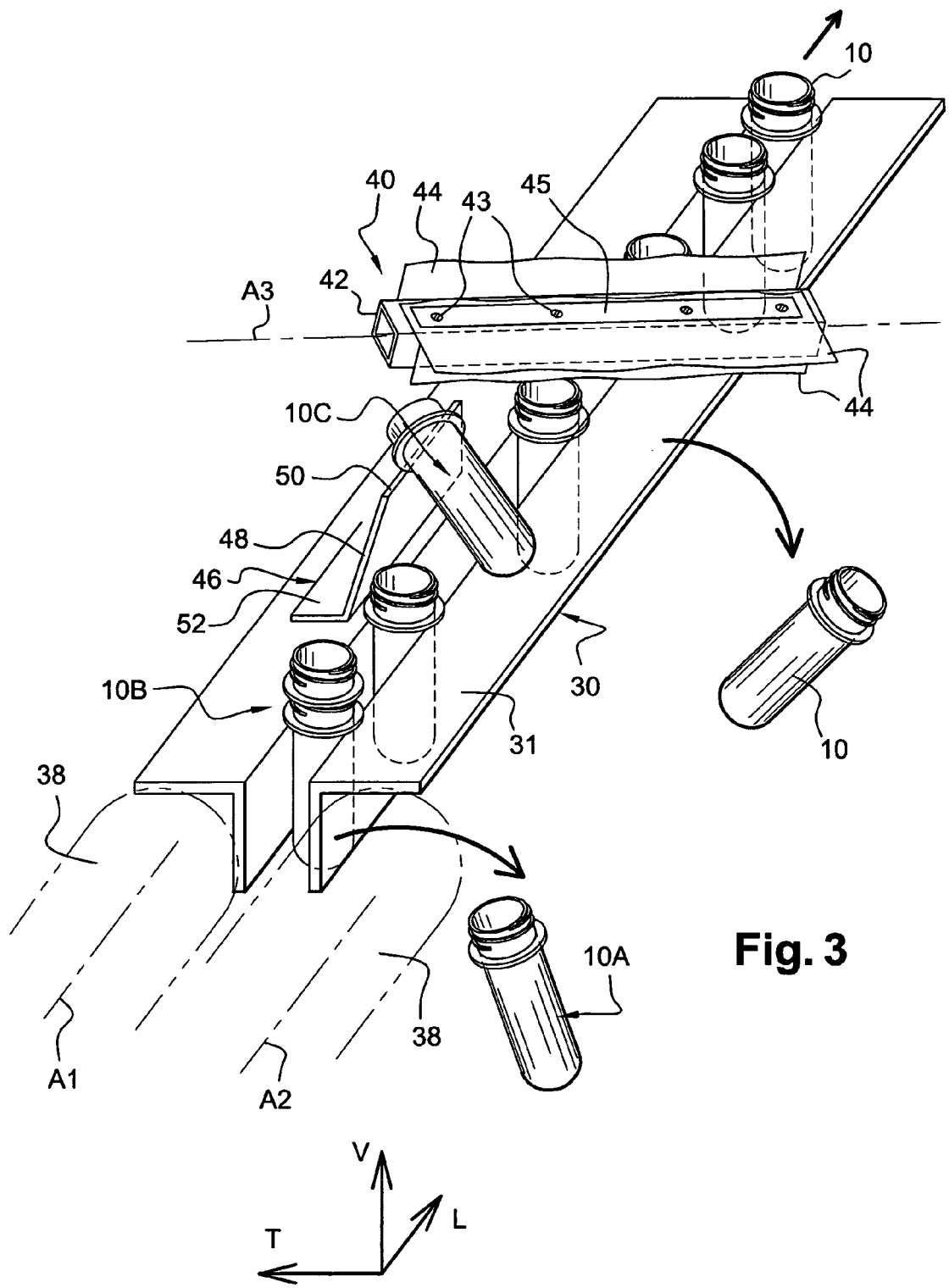
FIG. 3 is a partial schematic view in perspective of a system according to FIG. 2 comprising an ejection wheel that is arranged according to the invention downstream of the alignment rollers and illustrating different configurations of incorrectly positioned preforms.

FIG. 3 represents a feeding system 20 of the type comprising a sorting and alignment device 28, feeding rails 30 and means of ejecting the incorrectly positioned preforms 10 according to the teachings of the invention.

In a known manner, the sorting and alignment device 28 consists of a coffer comprising, for example, two vertical side walls 36. The bottom of the coffer is formed by two rollers 38, called alignment rollers, with substantially parallel axes A1 and A2 that extend substantially along at least a part or all the length of the coffer.

The axes A1 and A2 are inclined relative to the horizontal on a slope corresponding to the slope of inclination of the sorting and alignment device. These two axes A1 and A2 may be adjusted so as to have between them a few minutes of angle or a few degrees of angle.

As can be seen in FIG. 3, the two rollers 38 are spaced from one another so as to allow a calibrated space to subsist between them, its transverse dimension being slightly greater than the diameter of the body 12 of a preform 10 of the type represented in FIG. 1.

Thus, the diameter of the outer radial collar 18 of the neck 14 of the preform 10 is greater than the transverse dimension of the space separating the two rollers 38. In this way, when a preform 10 presents itself on the rollers 38, its body 12 can fall into the space between the two rollers 38 but it is then held by the collar 18 and respectively aligned in a substantially vertical position and oriented with the neck 14 upwards.

To promote the correct positioning of the preform 10, each alignment roller 38 is driven in a rotary motion about its respective axis A1 or A2. The two rollers 38 rotate in opposite directions from one another, either in the direction indicated in the figures, or each in the contrary direction.

To ensure that all the preforms 10 tipped into the sorting and alignment device 28 come into contact with the alignment rollers 38, the bottom portion of the side walls 36 of the coffer advantageously comprise faces that are inclined so as to bring all the preforms 10 to the centre of the sorting and alignment device 28, onto the rollers 38.

The preforms 10, on exiting the alignment rollers 38, are most frequently correctly positioned, that is to say that they are positioned vertically with the neck 14 upwards so that the collar 18 interacts with a portion of the feeding rails 30.

The preforms 10 are thus positioned in a substantially continuous line of preforms in order to be conveyed by the feeding rails 30 to the blow moulding machine 22.

According to the teachings of the invention, the feeding system 20 comprises an ejection wheel 40 that is arranged downstream of the alignment rollers 38 so as to eject the incorrectly positioned preforms from the feeding rails.

Advantageously, the ejection wheel 40 is arranged downstream of the rollers 38 so as to prevent any risk of accidental repulsion of an incorrectly positioned preform to the rollers 38 and to eliminate incidents such as blockages.

Preferably, the wheel is arranged downstream at a determined distance from the outlet of the rollers 38 so as to act on a substantially continuous line of preforms that are ordered and conveyed at a speed of travel that is generally constant and less than the speed reached at the output of the rollers.

The ejection operation is therefore carried out on an ordered stream of preforms, unlike the prior art in which it took place above the alignment rollers in which the preforms move in a disordered and chaotic manner until they manage to position themselves correctly.

Accordingly, the feeding rails 30 advantageously comprise at least one section 31 called a stabilization section which is generally rectilinear and interposed longitudinally between the output of the rollers 38 and the ejection wheel 40 in order to stabilize the stream of preforms originating from the rollers into a continuous and ordered line.

This eliminates the risks of interference between several incorrectly positioned preforms and also makes it easier to adjust the parameters of the ejection wheel 40, such as its speed of rotation, due to the fact that the travel speed of the preforms in the rails is substantially constant.

The ejection wheel 40 is arranged at a determined height above the feeding rails 30 and essentially comprises a central shaft 42 whose axis A3 extends in a plane parallel to the plane of the feeding rails 30.

The axis A3 is preferably inclined relative to a perpendicular to the longitudinal direction of travel of the preforms along the rails 30. The inclination of the axis A3 forms an angle lying between 0° and 90° relative to the said perpendicular to the rails 30.

The angle here is of the order of 45° but, depending on the speed of travel of the preforms 10 in the rails 30, that is to say depending on the geometry and the feeding rate of the system, this angle may vary and it lies preferably between 20° and 75°.

The shaft 42 is advantageously connected to a system for rotating about its axis A3, such as an independent motor (not shown).

Advantageously, the shaft 42 consists simply and economically of a hollow metal extrusion having a square cross section on a plane orthogonal to the axis of rotation A3. The cross section of the shaft 42 is more generally parallelepipedic and, as a variant, triangular.

The shaft 42 is furnished with flexible radial elements, such as plate-shaped paddles 44 that, in this instance, are four in number that extend radially and are distributed angularly in an even manner about the axis A3, and that are, for example, made of flexible elastomer.

The paddles 44 extend transversely along the axis A3 over such a width that, when the ejection wheel 40 is rotated about its axis A3, they substantially sweep all the width or else the whole transverse space situated above the feeding rails 30 forming a channel for routing the preforms 10.

The paddles 44 are fixedly attached to the faces of the shaft 42 extending transversely, for example, by means of fastening screws 43. Preferably, the heads of the fastening screws 43 press on a plate 45 for protecting and positioning the paddles 44 on the shaft 42.

The ejection wheel 40 thus produced is economical and the operations to change the paddles 44 are simple and fast.

As a variant, the paddles 44 could be replaced by flexible radial threads, the ejection wheel 40 then taking the form of a rotary brush.

The recovery hopper 32 advantageously comprises, in its upper portion, in the vicinity of the ejection wheel 40, walls (not shown) that extend generally vertically or are inclined towards the wheel 40 so as to capture the incorrectly positioned preforms that are in particular ejected by the wheel. The bottom portion of the recovery hopper 32 forms a guide for clearing away the ejected preforms to the recovery bin 34.

The operation of the means of ejecting the incorrectly positioned preforms will be better understood on reading the following description. Accordingly, FIG. 3 shows preforms in different configurations or positions (identified by letters) corresponding to the main cases of incorrectly positioned preforms that may occur in a feeding system 20.

According to a first configuration illustrated by the preform 10A, such a preform, called a "lying" type preform, single or nested, that reaches the junction of the downstream end of the alignment rollers 38 and the feeding rails 30 without having been able to be correctly positioned by the rollers 38, will usually be unbalanced and toppled.

Thus, such a preform 10A falls on its own into the recovery hopper 32 provided for this purpose and then into the bin 34 without any outside intervention.

According to a second configuration illustrated by the set of preforms 10B, when two preforms 10 are nested vertically in one another, that is to say of the "upright" nested type, this set of preforms 10B is then conveyed in the feeding rails 30 since the bottom preform is, in this case, correctly positioned.

However, and as will be understood, the top preform will nevertheless be ejected by the ejection wheel 40 when it comes into contact with the paddles 44 of the wheel.

Figure 4:
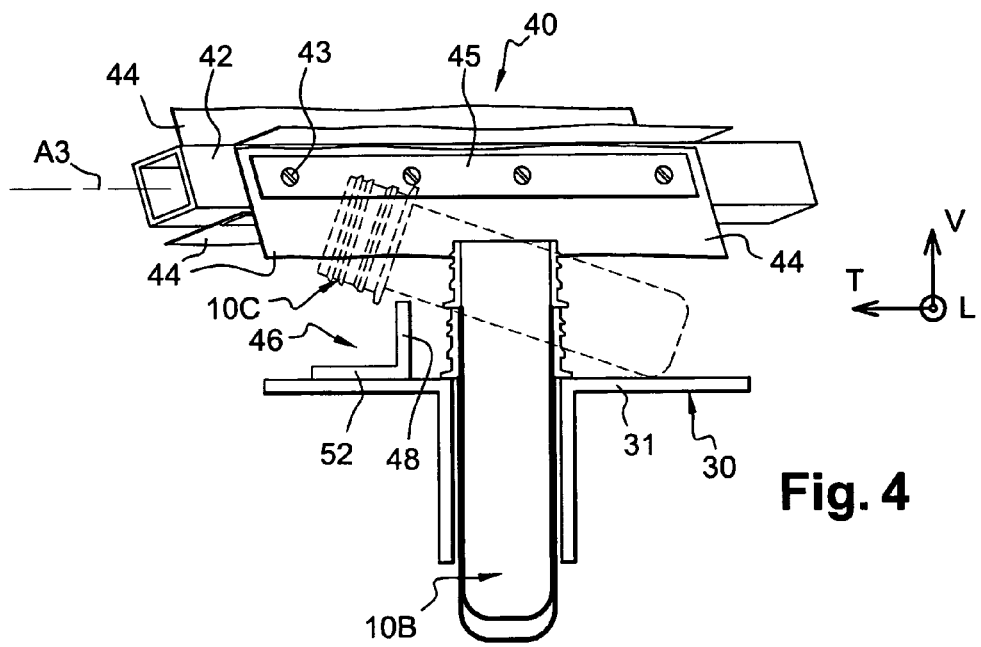
FIG. 4 is a schematic view according to FIG. 3 that represents in section the feeding rails conveying the preforms and the ejection wheel arranged above the rails.

Specifically, the vertical positioning of the wheel 40 and the radial dimension of the paddles 44 are chosen so that the wheel 40, rotated about its axis A3, sweeps the space situated immediately above the rails 30 without coming into contact with preforms that are correctly oriented between the feeding rails 30. More precisely, and as can be seen in FIG. 4, only the neck 14 of a correctly oriented preform 10 passes beneath the ejection wheel 40 without being touched by the latter.

According to a third configuration illustrated by the preform 10C, it is possible that lying preforms, usually not nested, do not fall at the outlet of the rollers 38 but, on the contrary, find a balanced position in which they extend, for example, generally transversely while straddling the feeding rails 30.

In particular it is possible that a preform positions itself in the configuration described hereinabove when it is held tight by the respective necks 14 of two adjacent preforms correctly positioned in the feeding rails 30.

Preforms 10 in this third configuration may not be ejected by the ejection wheel 40, and even, in some cases, become jammed or pass beneath the wheel which is not acceptable for the reasons detailed hereinabove.

This is why the system comprises, according to the invention, means 46 of lifting the incorrectly positioned preforms 10C of the lying type that extend in particular in a generally transverse position relative to the rails 30, in such a way as to cause them to be ejected by the ejection wheel 40.

Advantageously, the ejection wheel 40 is adjacent to the lifting means 46.

The lifting means 46 may occasionally unbalance the preform 10C and cause it to fall out of the feeding rails 30.

The lifting means 46 comprise at least one control section 48 in the form of an inclined ramp that is designed to interact with a portion of the lying preform 10C so as to cause it to be lifted from its initial position lying in a transverse position on the rails 30 to a high position, called the ejection position.

More precisely, when the preform reaches the ramp that is formed by the control section 48, the latter lifts a portion of the preform 10 that then no longer extends in a plane parallel to the plane of the rails 30.

When, after having been lifted, at least a portion of the preform 10C reaches this high position, this portion, such as the neck 14, will then come into contact with the paddles 44 of the wheel 40 and, under the action of the latter, be ejected from the rails 30.

Advantageously, the transverse axis A3 of the wheel 40 being inclined relative to the rails that extend in the longitudinal direction of travel, the lifting means 46 are arranged in the vicinity of the portion of the wheel 40 that is furthest upstream, that is to say closest to the rollers 38.

Advantageously, the lifting means 46 comprise, downstream of the control section 48 forming a ramp, a generally rectilinear retention section 50 in order to keep the preform 10C, after being lifted, in its high position for ejection.

The lifting means 46 are therefore preferably placed at least partly upstream of the ejection wheel 40.

Figure 5:
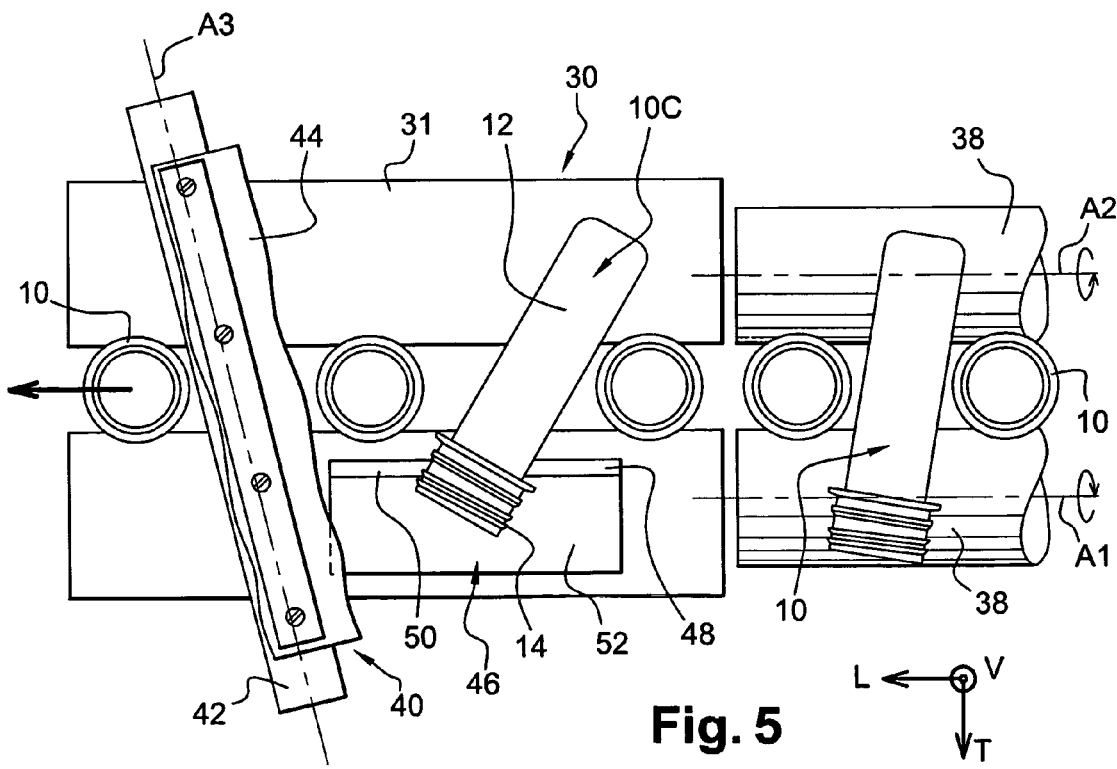
FIG. 5 is a top view of the feeding rails and of the ejection wheel according to FIGS. 3 and 4.

According to a possible embodiment illustrated in FIGS. 3 to 5, the lifting means 46 consist of at least one part 52 that is fixedly attached to one of the rails 30.

More precisely, the part 52 is here a bar of extruded section forming a bracket that is generally L-shaped, in cross section and that here extends longitudinally and parallel to the flat top face of the rail 30 to which it is attached.

Thus, any preform 10C that is lying, particularly transversely, will, on contact with the control section 48, be lifted to a high position and then be held there by the retention section 50 until it is ejected into the recovery hopper 32 by the ejection wheel 40.

Preferably, the feeding system 20 comprises lifting means 46 on only one of the rails 30.

The lying preforms 10C are therefore quickly and effectively extracted from the feeding rails 30 by the lifting means 46 in order to prevent any risk of blockage upstream of the wheel and/or to eliminate any risk of non-ejection of the incorrectly positioned preforms that are in this configuration.

Naturally, it will be possible to provide a device (not shown) for adjusting the vertical position and/or angular position of the ejection wheel 40, particularly relative to the feeding rails 30 so as to suit the geometry of the various types of preforms.

Preferably, the ejection wheel 40 and/or the lifting means 46 are arranged in a rectilinear section of the feeding rails 30, downstream of the stabilization section 31.

Unlike the prior art, the ejection wheel 40 arranged downstream of the alignment rollers 38 makes it possible to eject the incorrectly oriented preforms in a reliable manner preventing any risk of blockage in the rollers, particularly with high speed feeders.

The invention claimed is:

1. System (20) of feeding preforms, particularly designed to feed machines for blow moulding receptacles such as bottles, comprising, from upstream to downstream in the longitudinal direction of travel of the preforms (10), at least one sorting and alignment device (28) whose top end is provided with preforms (10) in a jumble and whose bottom end comprises at least two alignment rollers (38), substantially parallel and rotated about their respective axis (A1, A2), that are designed to position the preforms (10) in feeding rails (30), inclined relative to the horizontal, to convey them to a machine (22), and comprising at least one ejection wheel (40) that is arranged above the preforms (10) and rotated about an axis (A3), which axis (A3) extends generally parallel to a plane of the feeding rails, characterized in that the ejection wheel (40) is arranged downstream of the alignment rollers (38) so as to eject incorrectly positioned preforms (10) from the feeding rails (30) and in that it comprises means (46) of lifting the incorrectly positioned preforms (10), including single preforms (10C), of the lying type that extend in particular generally transversely relative to the feeding rails (30), so as to cause them to be ejected by the ejection wheel (40) arranged downstream.

2. System of feeding preforms according to claim 1, characterized in that the lifting means (46) comprise at least one control section (48) forming a ramp designed to interact with a part of the preform (10) lying transversely so as to cause it to be lifted from the rails (30) to a high position for ejection, in which the said part of the preform (10) is capable of entering into contact with a part of the wheel (40) to be ejected.

3. System of feeding preforms according to claim 2, characterized in that the lifting means (46) comprise, downstream of the control section (48) forming a ramp, a retention section (50) in order to retain the preform, after lifting, in its high position for ejection.

4. System of feeding preforms according to claim 3, characterized in that the ejection wheel (40) is positioned at a determined height above the feeding rails (30) so as to eject the incorrectly positioned preforms (10) without entering into contact with the preforms correctly positioned in the rails.

5. System of feeding preforms according to claim 3, characterized in that the ejection wheel (40) is positioned at a determined height above the feeding rails (30) so as to eject the incorrectly positioned preforms (10) without entering into contact with the preforms correctly positioned in the rails.

6. System of feeding preforms according to claim 3, characterized in that the transverse axis (A3) of the ejection wheel (40) extends generally in a plane parallel to the plane of the rails (30) and so as to form an angle lying between 0° and 90°, particularly between 20° and 75°, relative to the perpendicular to the longitudinal direction of travel of the preforms in the feeding rails (30).

7. System of feeding preforms according to claim 3, characterized in that the ejection wheel (40) comprises a shaft (42) having, in section along a plane orthogonal to the axis (A3) of rotation of the wheel, a parallelepipedic or triangular section.

8. System of feeding preforms according to claim 2, characterized in that the feeding rails (30) comprise at least one preform stabilization section (31), generally rectilinear, that is interposed longitudinally between the alignment rollers (38) and the ejection wheel (40).

9. System of feeding preforms according to claim 2, characterized in that the ejection wheel (40) is positioned at a determined height above the feeding rails (30) so as to eject the incorrectly positioned preforms (10) without entering into contact with the preforms correctly positioned in the rails.

10. System of feeding preforms according to claim 2, characterized in that the transverse axis (A3) of the ejection wheel (40) extends generally in a plane parallel to the plane of the rails (30) and so as to form an angle lying between 0° and 90°, particularly between 20° and 75°, relative to the perpendicular to the longitudinal direction of travel of the preforms in the feeding rails (30).

11. System of feeding preforms according to claim 2, characterized in that the ejection wheel (40) comprises a shaft (42) having, in section along a plane orthogonal to the axis (A3) of rotation of the wheel, a parallelepipedic or triangular section.

12. System of feeding preforms according to claim 1, characterized in that the feeding rails (30) comprise at least one preform stabilization section (31), generally rectilinear, that is interposed longitudinally between the alignment rollers (38) and the ejection wheel (40).

13. System of feeding preforms according to claim 12, characterized in that the ejection wheel (40) is positioned at a determined height above the feeding rails (30) so as to eject the incorrectly positioned preforms (10) without entering into contact with the preforms correctly positioned in the rails.

14. System of feeding preforms according to claim 12, characterized in that the transverse axis (A3) of the ejection wheel (40) extends generally in a plane parallel to the plane of the rails (30) and so as to form an angle lying between 0° and 90°, particularly between 20° and 75°, relative to the perpendicular to the longitudinal direction of travel of the preforms in the feeding rails (30).

15. System of feeding preforms according to claim 1, characterized in that the ejection wheel (40) is positioned at a determined height above the feeding rails (30) so as to eject the incorrectly positioned preforms (10) without entering into contact with the preforms correctly positioned in the rails.

16. System of feeding preforms according to claim 15, characterized in that the transverse axis (A3) of the ejection wheel (40) extends generally in a plane parallel to the plane of the rails (30) and so as to form an angle lying between 0° and 90°, particularly between 20° and 75°, relative to the perpendicular to the longitudinal direction of travel of the preforms in the feeding rails (30).

17. System of feeding preforms according to claim 1, characterized in that the transverse axis (A3) of the ejection wheel (40) extends generally in a plane parallel to the plane of the rails (30) and so as to form an angle lying between 0° and 90°, particularly between 20° and 75°, relative to the perpendicular to the longitudinal direction of travel of the preforms in the feeding rails (30).

18. System of feeding preforms according to claim 1, characterized in that the ejection wheel (40) comprises a shaft (42) having, in section along a plane orthogonal to the axis (A3) of rotation of the wheel, a parallelepipedic or triangular section.

19. System of feeding preforms according to claim 18, characterized in that the ejection wheel (40) comprises flexible radial elements, such as radial paddles (44), that are each fixedly attached to one of the faces of the shaft (42) of the ejection wheel (40).

20. System of feeding preforms according to claim 1, characterized in that it comprises means of recovering and/or recirculating, to the sorting and alignment device (28), the incorrectly positioned preforms (10) that have been ejected.

21. System of feeding preforms according to claim 1, wherein said incorrectly positioned preforms lifted by said means (46) of lifting includes i) both single and nested preforms positioned upright in the feeding rails, and ii) both single and nested preforms positioned lying in the feeding rails.

* * * * *